United States Patent [19]

Boutin et al.

[11] Patent Number: 4,941,916
[45] Date of Patent: Jul. 17, 1990

[54] PROCESS AND APPARATUS FOR SUPPLYING A KROLL REACTOR WITH ZIRCONIUM TETRACHLORIDE VAPOUR

[75] Inventors: Jean Boutin, St Martin D'Heres; Pierre Brun, Grenoble; Airy-Pierre Lamaze, Jarrie, all of France

[73] Assignee: Compagnie Europeenne Du Zirconium Cezus, Courbevoie, France

[21] Appl. No.: 171,267

[22] Filed: Mar. 21, 1988

[30] Foreign Application Priority Data

Mar. 31, 1987 [FR] France .................... 87 4776

[51] Int. Cl.$^5$ .............................. C22B 7/00
[52] U.S. Cl. .................... 75/10.12; 75/10.28; 423/76
[58] Field of Search .............. 75/84.5; 423/76; 266/175

[56] References Cited

U.S. PATENT DOCUMENTS

| | | | |
|---|---|---|---|
| 3,966,458 | 6/1976 | Spink | 75/84.5 |
| 3,966,460 | 6/1976 | Spink | 75/84.4 |
| 4,032,328 | 6/1977 | Hurd | 75/84.1 |
| 4,487,677 | 12/1984 | Murphy | 75/84.5 X |
| 4,511,399 | 4/1985 | Kwon et al. | 75/84.5 |
| 4,518,426 | 5/1985 | Murphy | 75/112 |
| 4,711,664 | 12/1987 | Kwon et al. | 75/84.5 |

FOREIGN PATENT DOCUMENTS

| | | |
|---|---|---|
| 1290579 | 5/1961 | France . |
| 1299851 | 6/1962 | France . |
| 1353163 | 2/1963 | France . |
| 2075990 | 1/1971 | France . |

Primary Examiner—Peter A. Nelson
Attorney, Agent, or Firm—Dennison, Meserole, Pollack & Scheiner

[57] ABSTRACT

The invention relates to a process and apparatus for the supply of a Kroll reactor with zirconium tetrachloride vapor, in which zirconium chloride powder is vaporized in a sublimator by heating power and the vapor obtained is passed into the reactor. Part of the heating power applied in the sublimator is supplied to the powder by an internal heating means, and the remainder of the heating power is supplied to the wall of the sublimator by an external heating means. The heating power of the internal heating means is used for the sublimation of the zirconium tetrachloride powder and the heating power of the external means is applied in order to compensate the heat losses of the wall of the sublimator. The apparatus for application of the method includes a means for measuring the wall temperature of the sublimator and a regulator sensitive to the variation of this temperature with respect to a nominal temperature and which is capable of modifying the power applied to the external and internal heating means, with the total power remaining constant for a fixed vapor flow rate.

6 Claims, 2 Drawing Sheets

PROCESS AND APPARATUS FOR SUPPLYING A KROLL REACTOR WITH ZIRCONIUM TETRACHLORIDE VAPOUR

The invention relates to a process and an apparatus for the supply of zirconium tetrachloride vapour or ZTC to a reactor for reducing said ZTC according to the Kroll process.

In the Kroll process, the ZTC vapour reacts with magnesium to give magnesium chloride and zirconium. The magnesium is placed in the reactor before the start of the operation and the ZTC is introduced continuously into the reactor by a tube at an as constant as possible flow rate during the operation until all the magnesium is consumed.

The introduction of ZTC in the pure vapour state into the reactor makes it possible to obviate the inert gas atmosphere necessary when the ZTC is introduced in powder form into the reactor where it sublimates before reacting.

Vaporization of the ZTC is carried out in a sublimator outside the reactor. The previously introduced ZTC powder is raised to the sublimation temperature, the sublimator being connected to the upper part of the reactor by the ZTC vapour transfer pipe.

According to U.S. Pat. No. 4 511 399, the sublimator is heated in a random manner (either maintaining a constant temperature, or maintaining its temperature between two given limits, or constant heat supply) and the regulation of the ZTC flow rate takes place by acting on the temperature of a condenser placed in the sublimator. In this way, the reaction becomes relatively insensitive to the sublimator heating conditions. However, there is a high energy consumption on the part of the sublimator, which is permanently excess heated, the temperature of the sublimated ZTC being lowered and its flow rate regulated by the cooling ensured by the condenser.

The Applicant has developed a process and apparatus for the sublimation of ZTC for the supply of a Kroll reactor, which consumes less energy, whilst still satisfying the needs as regards the regulation and modification of the ZTC vapour flow rate.

DESCRIPTION OF THE INVENTION

The invention relates to a process for the supply of a Kroll reactor with zirconium tetrachloride vapour in which, as is known, zirconium tetrachloride powder is vaporized in a sublimator through the supply of calorific power and the vapour obtained is passed into the reactor.

According to the invention, part of the calorific power is supplied to the powder by an internal heating means and the remainder of the calorific power is supplied to the wall of the sublimator by an external heating means and the calorific power of the internal heating means is essentially used for the sublimation of the ZTC powder and the calorific power of the external heating means for compensating thermal losses of the sublimator wall.

Thus, the average calorific power used by the internal heating means during sublimation is typically 55 to 75% of the total power, whilst the average calorific power used by the external heating means is typically 25 to 45% of said same total power.

There is no need to use a flow rate regulating condenser as the prior art. A good regulation of the ZTC vapour flow rate is obtained by using for the sublimator wall temperature a nominal or rated temperature above the sublimation temperature of ZTC, by measuring the real temperature of the wall and by modifying the distribution of the calorific power of the sublimator between the internal and external heating means in the sense that any variation between the wall temperature and the nominal temperature is cancelled out.

The heat of the internal means, supplied directly to the hot solid ZTC, is essentially used for sublimation.

The heat of the external means is essentially used for compensating the thermal losses of the apparatus and for maintaining its envelope at a nominal temperature which typically exceeds by 5° to 50° C. and preferably 10° to 25° C. the sublimation temperature of the ZTC (331° C.) and is advantageously approximately 350° C.

The total electric heating power supplied to the sublimator is typically constant under established operating conditions and for a given ZTC vapour flow rate. When, for example, the wall temperature drops below the nominal temperature, the power supplied to the external means is increased by a certain amount and by the same amount there is a decrease in the power supplied to the internal means until the wall temperature has again risen to the nominal temperature.

This process, which has a low inertia due to the separation of the two heating means, permits a flexible and easy regulation of the sublimation procedure and consequently a very good regularity of said flow rate and a rapid adaptation thereof to possible variations in the ZTC vapour demand. This leads to pressure security in the sublimator and the reactor.

The invention also relates to a sublimator for performing this process. Such a sublimator essentially comprises:

a tight enclosure containing the solid ZTC connected to the reactor by a supply pipe,
one or more external enclosure heating means,
one or more internal charge heating means,
at least one enclosure wall temperature detector,
at least one wall temperature regulator able to modify the calorific power of the external means in accordance with the temperature detector reading,
a total calorific power regulator making it possible to regulate said power to a given value corresponding to the desired vapour flow rate under established operating conditions, to distribute a fraction of said power to the external means via the temperature regulator and to distribute to the internal means the difference between the total power and the fraction supplied at all times to the internal means.

The external means can be hairpin-like electrical resistors located in the vicinity of the sublimator wall which they heat by radiation.

In a variant of the apparatus, the external heating is subdivided into a number of zones, each provided with a wall temperature detector and a temperature regulator.

The internal means are advantageously an electric heating hearth in contact with the charge, said hearth e.g. incorporating Inconel bars.

Preferably, the wall temperature regulator functions in derivative proportional integral control.

The following example describes an apparatus according to the invention and the operation thereof.

Figure 1:
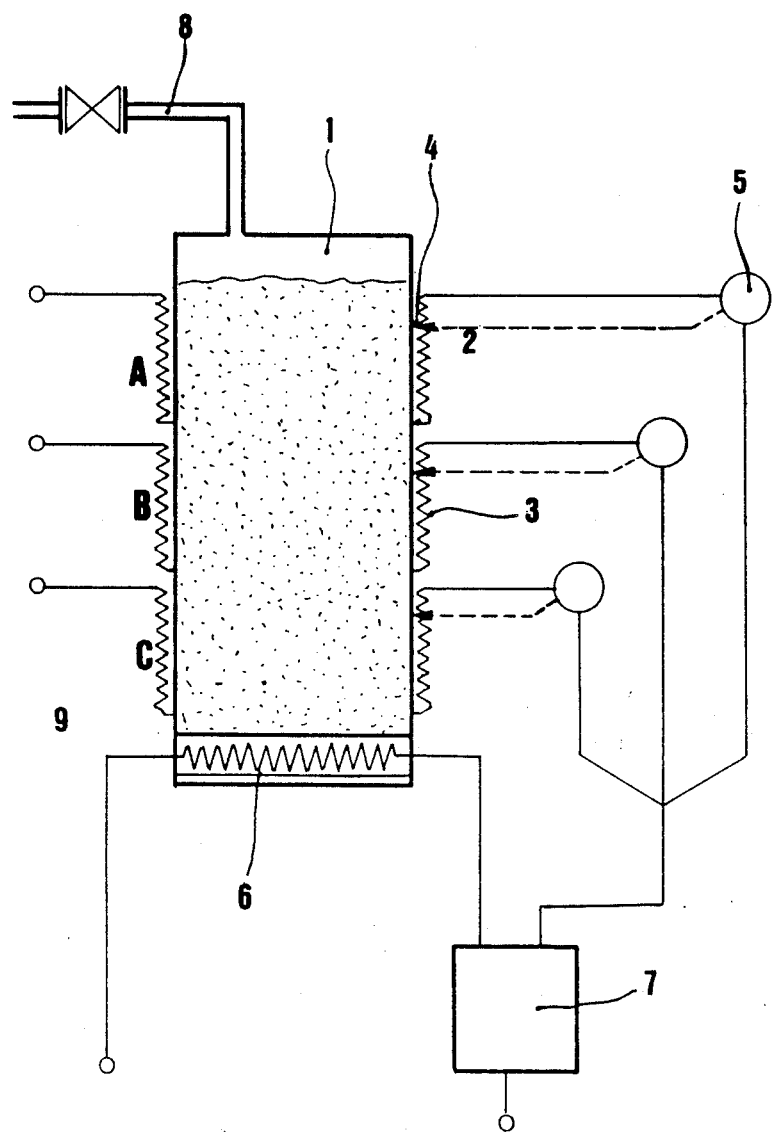
FIG. 1 is a sectional view of the Kroll reactor of the invention.

In FIG. 1, the enclosure of sublimator 1 is a vertical Inconel 600 cylinder 2 with a diameter of 2 meters and a capacity of approximately 20 m³ containing the powder charge 9.

The side walls are externally heated by resistors 3 distributed over three zones A, B, C over the height of the apparatus and totalizing a power of 40 kW for a voltage of 220 V. Each zone A, B or C has a wall temperature detector 4 and a regulator 5 responding to the variation of said temperature for modifying the value of the live resistance, i.e. the heating power. The internal heating is obtained by a heating hearth 6 of 75 kW for 75 V.

A power regulator 7 applies to the hearth the difference between the total constant displayed power under permanent operating conditions corresponding to the desired vapor flow rate and the power supplied to the walls by the temperature regulators 5. Pipe 8 links the sublimator with the not shown reactor.

The installation also has means for weighing the sublimator, so that at regular intervals the vapour weight leaving the sublimator is established, so that there are corresponding average flow rates during these time intervals.

In order to carry out an operation a charge of 15 tonnes of ZTC powder is placed on the sublimator hearth. The preheating period has lasted 8 hours with a total power of 100 kW, distributed at a rate of 70 kW on the hearth and 35 kW on the walls, without supplying vapour to the reactor. The regulation system operated during this period, the walls consuming all the permitted external heating power, i.e. 35 kW.

On reaching the nominal temperature of the wall (350° C.), the total power was raised to 75 kW theoretically corresponding to a ZTC vapour flow rate of 400 kg/h, 45 kW passing to the hearth and 30 kW to the walls and in this way the reactor was supplied. These permanent operating conditions were maintained, excepting for small variations due to the regulation, for 30 hours.

At the end of operation, for the last 8 hours, the total power was dropped to 60 kW (45 kW on the hearth and 15 kW on the walls), whilst continuing to supply the reactor. Thus, as the ZTC height in the sublimator had dropped, less wall heating was required. During the operation, the sublimator was weighed every hour and it was possible to establish that the variation between the extreme hourly flow rates did not exceed 25 kg/h, which constitutes a very good regularity. In general terms, after each weighing operation, it is possible to modify the total power so as to come as close as possible to the previously fixed flow rate.

Figure 2:
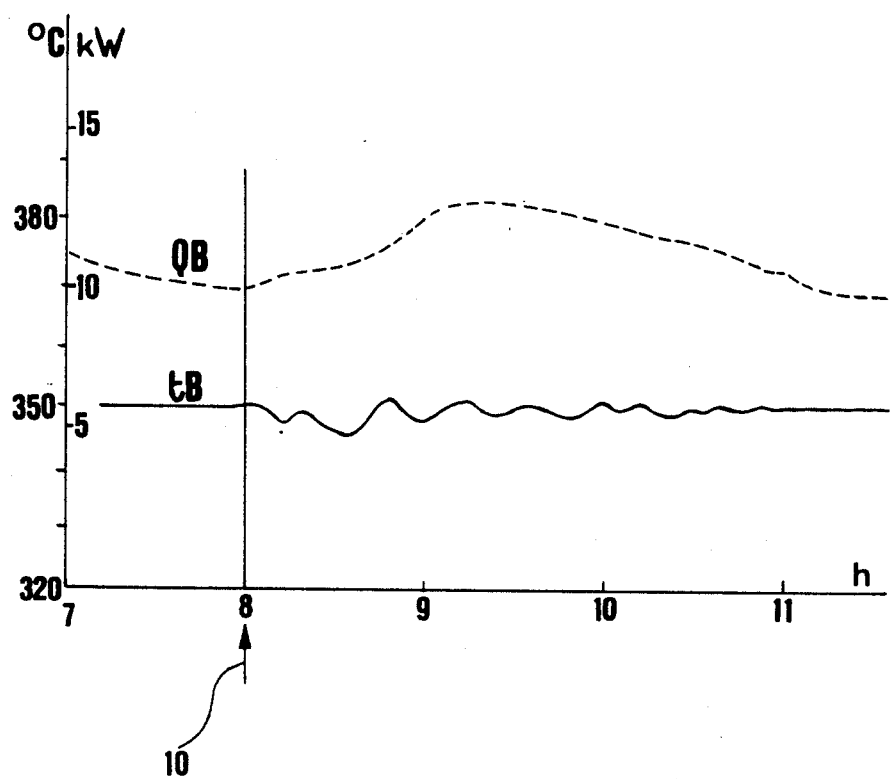
FIG. 2 is a plot of wall temperature versus power for a given period of time.

FIG. 2 shows the wall temperature curve $t_B$ (in continuous line form) and the power curve $Q_B$ (in dotted line form) of zone B under permanent operating conditions for 4 hours in exemplified manner. It can be seen that the temperature and power vary very slightly as a result of the thermal inertia of the system and that the reactor supply, which started at the beginning of the 8th hour (arrow 10) has only a limited effect on the wall temperature.

We claim:

1. In a process for supply of a Kroll reactor with zirconium tetrachloride vapor by vaporization of zirconium tetrachloride powder in a sublimator utilizing heating power, and passing the vapor obtained into the reactor, the improvement comprising supplying a major portion of the total heating power to the power internally of the sublimator for sublimation of the zirconium tetrachloride powder, and supplying the remainder of the heating power externally of the sublimator to a wall of said sublimator in order to compensate heat losses of the wall.

2. Process according to claim 1, wherein the wall temperature of sublimator is fixed a nominal temperature above the zirconium tetrachloride sublimation temperature, the temperature ($t_B$) of said wall (7) is measured and the distribution of the heating power between the internal and external heating means is modified in such a way as to cancel out any variation between the wall temperature ($t_B$) and the nominal temperature.

3. Process according to claim 2, in which the nominal temperature is 5° to 50° C. above the sublimation temperature.

4. Process according to claim 1, 2 or 3, in which the mass flow rate of the zirconium tetrachloride vapour is determined at regular intervals and as a consequence thereof the total heating power is modified in order to modify said flow rate.

5. Process according to claim 4, in which said mass flow rate is determined by weighing the sublimator.

6. Process according to claim 1, wherein the heating power supplied to the powder internally of the sublimator is supplied by an electric heating hearth in contact with the powder.

* * * * *

UNITED STATES PATENT AND TRADEMARK OFFICE
CERTIFICATE OF CORRECTION

PATENT NO. : 4,941,916
DATED : July 17, 1990
INVENTOR(S) : Jean Boutin et al

It is certified that error appears in the above-identified patent and that said Letters Patent is hereby corrected as shown below:

Column 3, lines 1-2, to read as follows:

--FIG. 2 is a graph containing plots of wall temperature versus time and power versus time for a given time period.--

Signed and Sealed this

Second Day of July, 1991

Attest:

HARRY F. MANBECK, JR.

*Attesting Officer*  *Commissioner of Patents and Trademarks*